United States Patent [19]
Johansson et al.

[11] Patent Number: 5,928,451
[45] Date of Patent: Jul. 27, 1999

[54] METHOD OF SOCKETING A PIPE

[75] Inventors: Mats Johansson, Fristad, Sweden; Jyri Jarvenkylä, Hollola, Finland

[73] Assignees: Uponor B.V., Netherlands; Vinidex Tubemakers Pty., Ltd, Austria

[21] Appl. No.: 09/043,488

[22] PCT Filed: Sep. 20, 1996

[86] PCT No.: PCT/SE96/01171

§ 371 Date: May 8, 1998

§ 102(e) Date: May 8, 1998

[87] PCT Pub. No.: WO97/10942

PCT Pub. Date: Mar. 27, 1997

[30] Foreign Application Priority Data

Sep. 20, 1995 [SE] Sweden .................................. 9503256

[51] Int. Cl.$^6$ .................................................. B29C 57/04
[52] U.S. Cl. .................. 156/242; 156/273.3; 156/294; 264/492; 264/249; 264/296; 264/322; 425/393; 425/DIG. 218
[58] Field of Search ................................. 156/212, 214, 156/242, 245, 273.3, 294; 264/492, 249, 267, 296, 322, 323; 425/398, 393, DIG. 218

[56] References Cited

U.S. PATENT DOCUMENTS

| | | | |
|---|---|---|---|
| 3,852,016 | 12/1974 | Delauzun | 425/393 |
| 4,276,010 | 6/1981 | Shartzer | 428/392 |
| 4,428,900 | 1/1984 | Riley et al. | 264/526 |
| 4,643,658 | 2/1987 | Gordon | 425/393 |
| 5,527,503 | 6/1996 | Rowley | 264/296 |

FOREIGN PATENT DOCUMENTS 2242923  3/1974  Germany .

*Primary Examiner*—Michael W. Ball
*Assistant Examiner*—Michael A Tolin
*Attorney, Agent, or Firm*—Joseph C. Mason, Jr.; Dennis G. LaPointe

[57] ABSTRACT

A method of socketing a pipe of oriented plastic having an annular groove inside the socket. An end portion (15) of the pipe is pushed onto a cylindrical mandrel element (11) and the region ($l_1$) of the end portion at the opening thereof where the groove is to be located is heated to a temperature above the glass transition temperature of amorphous plastic and the crystalline melting point of crystalline plastic, respectively. The rest of the end portion is maintained at a temperature below the glass transition temperature or the crystalline melting point, respectively. The end portion (15) when said region is at a temperature above the glass transition temperature or the crystalline melting point, respectively, is pushed onto a second mandrel element (13) axially aligned with the first mandrel element the bottom portion of the socket being formed by said second mandrel element (13). The rest of the end portion is expanded to form the bottom portion of the socket. The end portion of the pipe is cooled and is then withdrawn from the mandrel elements.

20 Claims, 4 Drawing Sheets

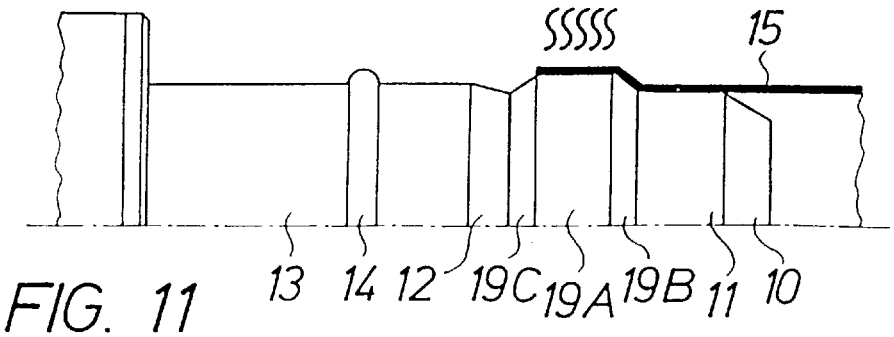
FIG. 11    13  14  12  19C 19A 19B 11  10
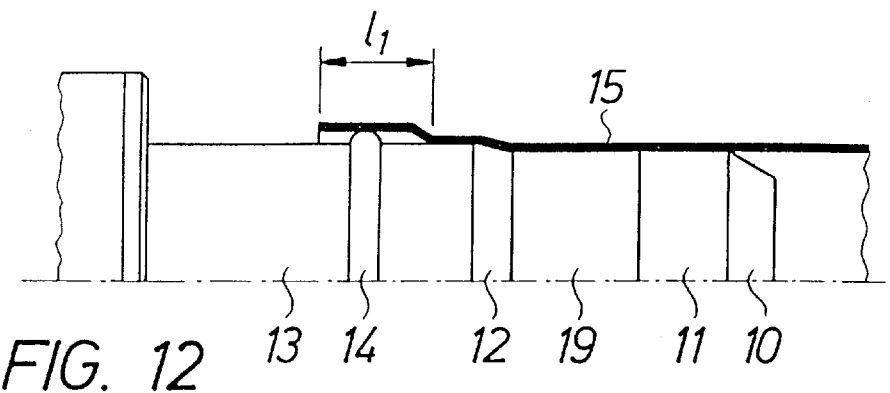
FIG. 12    13  14  12  19  11  10
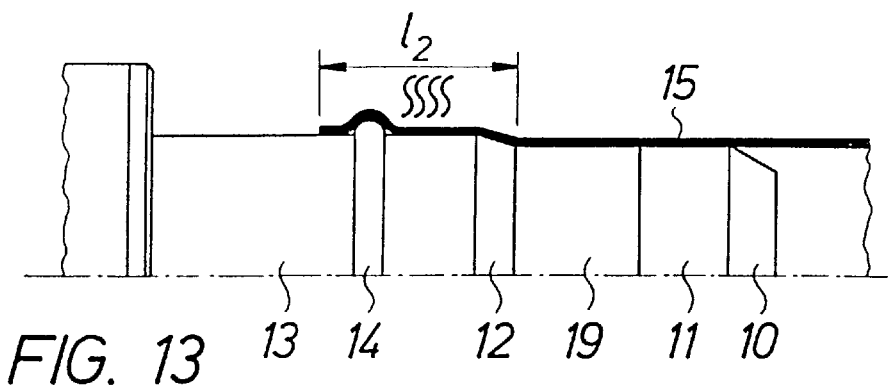
FIG. 13    13  14  12  19  11  10
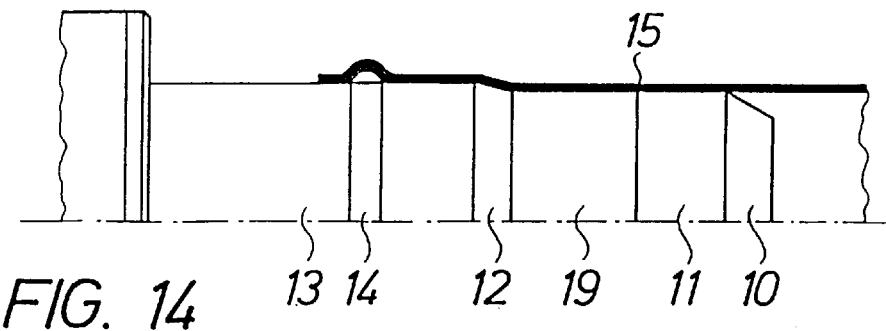
FIG. 14    13  14  12  19  11  10

METHOD OF SOCKETING A PIPE

BACKGROUND OF THE INVENTION

1. Field of the Invention

The present invention relates to a method of socketing a pipe of oriented plastic having an annular groove inside the socket. This groove is provided to receive an elastic gasket for sealing between the socket and a spigot end of another pipe when two pipes are to be interconnected.

2. Description of Related Art

The common method in forming a socket or bell on a pipe of plastic which is not oriented, and at the same time providing an annular groove inside the socket comprises heating of an end portion of the pipe to a temperature substantially above the glass transition temperature of amorphous plastic or the crystalline melting point of crystalline plastic, respectively, and pushing the heated end portion of the pipe onto a mandrel having a collapsible core for forming said groove. The core is in the expanded condition when the end portion is pushed onto the mandrel. After cooling of the end portion the core is collapsed and the socketed pipe is withdrawn from the mandrel.

It is also prior art to slip a sealing ring or gasket onto the mandrel and to form the groove in the end portion of the pipe over the sealing ring which is left in the groove and is withdrawn from the mandrel together with the pipe.

When the socket shall be formed on a pipe of oriented plastic, particularly of MOPVC (molecular oriented polyvinylchloride) two problems are encountered which do not exist in case of pipes of non-oriented plastics material, viz.

1) to avoid stress concentration in the plastic material during socketing in the region where the groove shall be formed (the material is more sensitive to cracking around the periphery than normally because draw normally is higher in the hoop direction than in the axial direction), and
2) to control accurately the degree of possible axial shrinkage during socketing thus avoiding unnecessary compression that might reduce the elongation at break, These problems are overcome by the method of the present invention.

SUMMARY OF THE INVENTION

When the oriented plastic is heated much over the glass transition temperature or the crystalline melting point, respectively, it will shrink onto the mandrel, which increases the friction between the pipe and the mandrel. The heated material also is softer, and by the combination of softer material and increased friction the plastic will be compressed when the heated end portion is pushed onto the mandrel. Heating of the end portion of the pipe is necessary because the forces required to push the end portion over the expanded collapsible core, the sealing ring, or a prefabricated groove core, respectively, will be too high if the temperature of the plastic is below the glass transition temperature or the crystalline melting point, respectively. However, in the method of the invention the compression of the plastic is well controlled and limited mainly to the region of the end portion of the pipe wherein the groove inside the socket is to be located, and thus the forces necessary to move the end portion of the pipe over the core or the sealing ring, respectively, can still be kept at a low and acceptable value. If the pipe is manufactured with axial draw then the heating of the end portion of the pipe will cause axial draw of the pipe to be reduced which provides an increase of the wall thickness in said region sufficient to compensate for the hoop streching of the pipe wall not only where the groove is located but also in the cylindrical part of the pipe.

By limiting the heating of the plastic above the glass transition temperature or the crystalline melting point, respectively, to the region wherein the groove inside the socket is to be located the two problems mentioned above thus will be overcome.

BRIEF DESCRIPTION OF THE DRAWINGS

The invention will be described in more detail below reference being made to the accompanying drawings disclosing illustrative embodiments of the invention and wherein FIGS. 10–14 are similar views as FIGS. 1–3 and 4A disclosing successive steps in the method of the invention in a third embodiment thereof.

DESCRIPTION OF THE INVENTION

Figure 1:
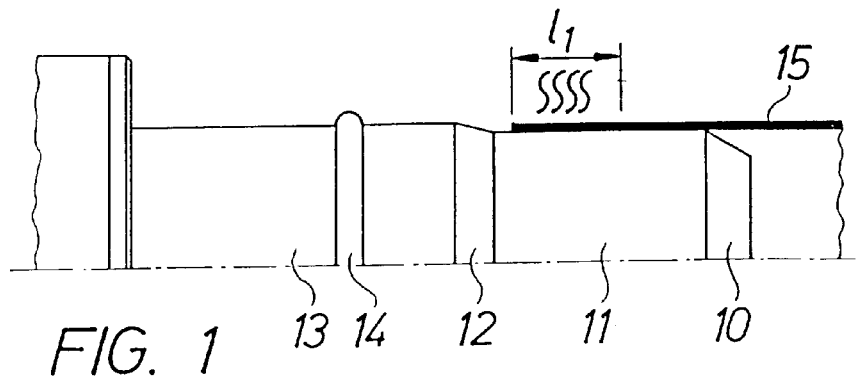
FIGS. 1–3 and 4A are side views of a mandrel with a pipe shown in axial cross sectional view and disclose successive steps in the method of the invention in one embodiment thereof.

With reference to FIGS. 1–3 and 4A the mandrel used in the embodiment of the method of the invention disclosed therein is made of a hard wear resistent material such as steel, or another suitable material as is well known in the art. The mandrel comprises a conical end element 10 forming the tip of the mandrel, a cylindrical first mandrel element 11, a conical transition element 12, and a second cylindrical mandrel element 13. The mandrel can have vacuum passages and means (not shown) for heating and/or cooling the mandrel as may be necessary. On mandrel element 13 there is provided a collapsible core 14 which can be of a construction well known in the art. The collapsible core can be adjusted by means not shown between an expanded condition shown i FIGS. 1–3, wherein the core forms an annular ridge the shape of which corresponds to the shape of the annular groove to be provided inside the pipe socket or bell to be formed on the mandrel, and a collapsed condition shown in FIG. 4A, wherein the core is flush with the cylindrical surface of mandrel element 13. Mandrel element 13 and transition element 12 define the shape of the socket to be formed.

A pipe of plastic the end portion of which is shown at 15 has uniform cylindrical shape and shall be formed with a socket or bell in said end portion and with an annular groove in the inside surface of the socket for the reception of an elastic gasket, usually a rubber gasket, which shall form a seal between the socket and the spigot end of another pipe inserted into the socket. As an initial step of the method of the invention the pipe end portion 15 may be preheated to a temperature which is close to but still below a temperature $T_0$ which is the glass transition temperature $T_g$ of an amorphous plastic material, or the crystalline melting point $T_m$ of a crystalline plastic material, respectively, although such preheating is not necessary in practising the method of the invention. After preheating the pipe end portion 15 is pushed onto mandrel element 11 which has a diameter substantially corresponding to the inside diameter of the pipe, FIG. 1. The outer surface of the mandrel can be made smooth and slippery e. g. by a chrome-tetrafluoro ethylene coating. Additionally, a lubricant such as silicone oil can be applied to the surface of the mandrel to adjust the friction between the pipe and the mandrel when the pipe is pushed onto the mandrel A length $l_1$ of the pipe end portion at the opening of the pipe is heated to a temperature $T_1$ above temperature $T_0$ when the pipe end portion is on mandrel element 11. This heating can be effected by hot water spray, by radiation heating, or by circulating hot air in a jacket surrounding the pipe. However, the best result would be obtained by IR heating since the heating effect in that case easily can be focused on a predetermined region of the pipe end Normal IR radiation comprises wave lengths corresponding to absorption peaks in the material, which causes overheating of the outside surface of the pipe. However, if these wave lengths are shut out by a filter e. g. a quartz glass filter, uniform heating of the length $l_1$ of the pipe end portion can be obtained as is important in order to control the orientation of the material. For example, for poyethylene material the wavelengths to be filtered away are in the region of 2 to 10 $\mu$m, and the effective heating wavelength should be substantially 1.2 $\mu$m. The surface of the heated portion of the pipe may be protected by a protective gas. The rest of the end portion of the pipe is kept below the temperature $T_0$. Temperature $T_1$, should be below the rupture temperature of the plastic, i.e. the temperature at which further temperature increase involves increasing risk of rupture of the pipe.

Figure 2:
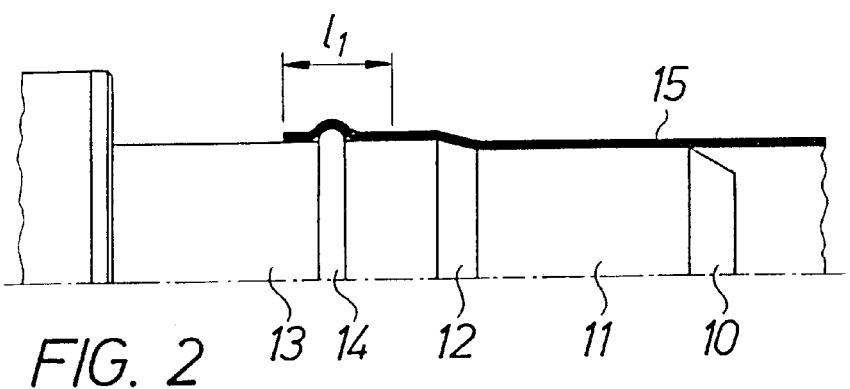
Figure 3:
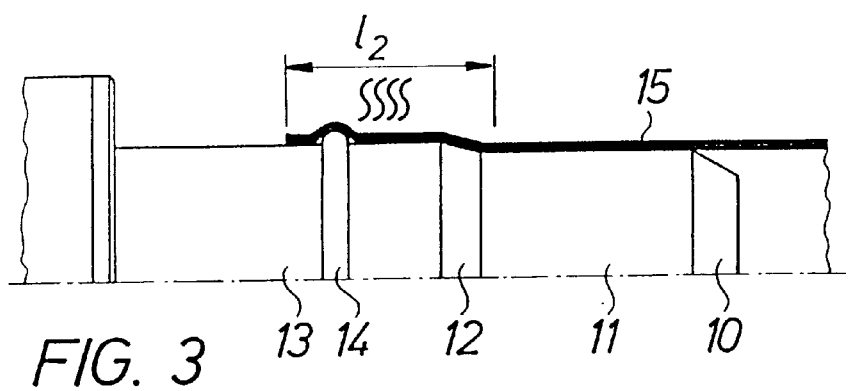

The next step in the method comprises pushing of the end portion of the pipe further axially along the mandrel onto mandrel element 13 via transition element 12 the end portion of the pipe being pressed over expanded core 14 to the position disclosed in FIG. 2, As will be seen in FIG. 2 length $l_1$ is dimensioned such that it extends from the opening of the pipe symmetrically at both sides of core 14 so that the groove in the inner surface of the socket will be formed in that length of the pipe. The soft plastic of length $l_1$ will be stretched in the hoop direction over core 14 and may be slightly compressed axially by the force necessary to move the pipe over the core. By the heating of the end portion of the pipe the possible axial draw of the pipe will be reduced, which increases the wall thickness sufficiently to compensate for the decrease of the wall thickness which is due to the stretching in the hoop direction. Selected surfaces of the mandrel may be rough or serrated in order to increase the friction between the mandrel and the pipe. The roughened or serrated surface in combination with vacuum in the mandrel and/or pressure in a space defined around the mandrel and the pipe thereon provide means for controlling axial shrinkage of the pipe. With the pipe in this position on the mandrel a length $l_2$. of the pipe end portion, FIG. 3, may be heated to a temperature $T_2$ which is above $T_0$ and can be but is not necessarily the same temperature as $T_1$. By this heating which also can be effected by radiation heating in a jacket surrounding the pipe the shape of the length $l_2$ of the pipe will snugly conform with the shape of core element 13, transition element 12 and core 14, i.e. this length of the pipe will form the grooved socket and the pipe wall may resume the same wall thickness as the rest of the pipe due to the memory of the plastic. It is possible in this stage to use a pressure chamber, vacuum, or mechanical clamps in order to press the pipe against the mandrel surface under full calibration of the socket and the inside groove thereof as is well known in the art.

Figure 4A:
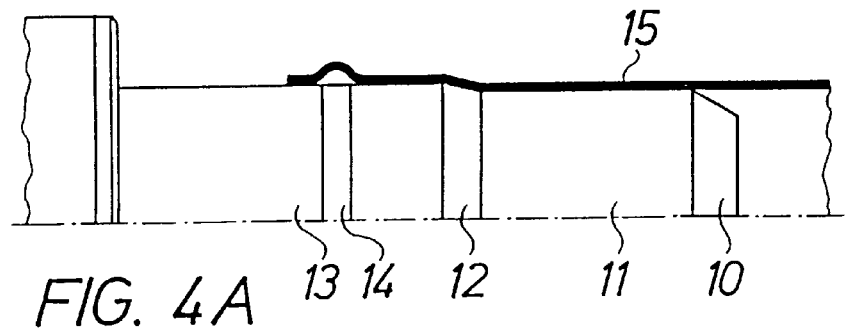

After cooling of the end portion of the pipe e. g. by means of sprinkling water, core 14 is collapsed, FIG. 4A, and then the socketed pipe is withdrawn from the mandrel. If the plastic of the pipe is oriented polyvinylchloride (MOPVC), temperature $T_0$ is about 80° C. and temperatures $T_1$ and $T_2$ can have the same value or can have different values but should be at most 105° C. which is the rupture temperature of MOPVC. Preferably $T_1$ is 95° C. and $T_2$ is 90° C. Corresponding temperatures for PEX can be $T_0$=135° C., $T_1$=150° C., and $T_2$=140° C. but not higher than 190° C.

Instead of using a collapsible core as described above the groove can be formed over a sealing ring which is passed onto the mandrel and is withdrawn from the mandrel together with the pipe, the sealing ring thus forming an integral part of the pipe. In this case the depth of the groove can be reduced and the radius of curvature at the bottom of the groove can be increased as compared with the bottom radius of a groove provided to receive a separate sealing ring or gasket, which means that stress concentrations in the material will be reduced and that the force necessary to push the pipe over the sealing ring on the mandrel will be reduced. Particularly useful in this connection is a gasket of the type having a steel or plastic retainer ring which makes possible further to reduce the internal diameter of the groove without the risk of the gasket slipping out of the groove accidentally. The best profile for a gasket of this type would be symmetrical with a low angle side rise, i. e. less than 30°, in order that the pipe can be more easily pushed over the gasket. Also a very large radius of curvature on the top of the gasket or even a straight top will minimize the stresses acting against the socket groove. In this connection reference is made to SE-B-463 329 the disclosure of which is included herein by reference. This publication discloses the use of a separate core having a preformed groove for a sealing ring therein, said core being slipped onto the mandrel. The pipe is pusched over the core which is left in the pipe when it is withdrawn from the mandrel. This feature is particularly well suited to be applied in the method of the invention due to the radial shrinkage of the orientation, which effectively maintains the core in place. This arrangement known in the field of light weight sewer pipes offers a new interesting possibility in the field of connecting oriented polyolefine pressure pipes.

Figure 4B:
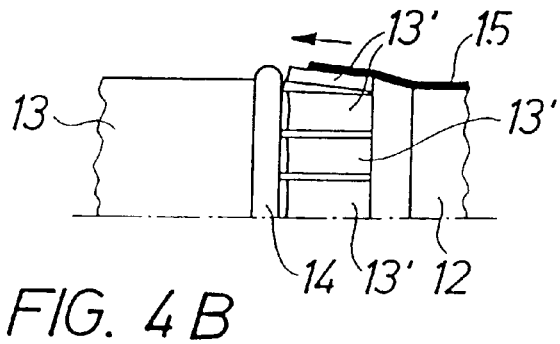
FIGS. 4B and 4C are fragmentary views of the mandrel in FIGS. 1–3 and 4A disclosing a modified structure of the mandrel.
Figure 4C:
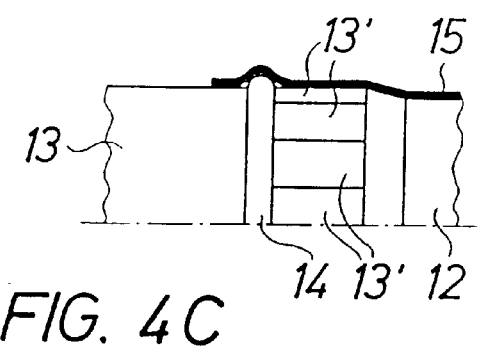

In order to reduce the compression of the pipe when it is pushed onto the mandrel the arrangement disclosed in FIGS. 4B and 4C can be used. As shown in these figures the mandrel element comprises segments 13' between the transition element 12 and the core 14 (or a sealing ring slipped onto the mandrel), which are pivotally mounted at the right ends thereof as seen in the figures and can be raised e. g. by hydraulic means so that their left ends will be substantially at the same level as or at a higher level than the top of the core 14 (sealing ring), as seen in FIG. 4B. In this position the segments form an ascending path for the pipe 15 when it is pushed onto the mandrel so that the pipe is gently expanded substantially to an inner diameter corresponding to the diameter of the core (sealing ring) and the force necessary in order to push the pipe over the core (sealing ring) will be substantially reduced. Then, when the pipe has reached the prescribed position on the mandrel the segmnte 13' are shut down to the position in FIG. 4C.

Figure 5:
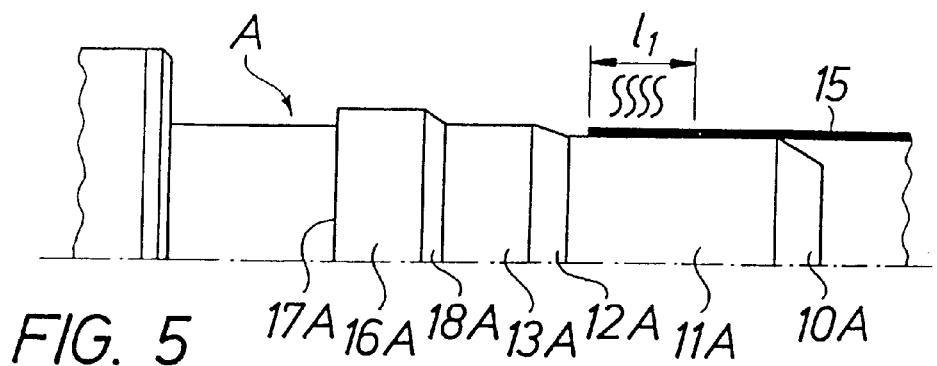
FIGS. 5–9 are similar views as FIGS. 1–3 and 4A disclosing successive steps in the method of the invention in a second embodiment thereof.
Figure 6:
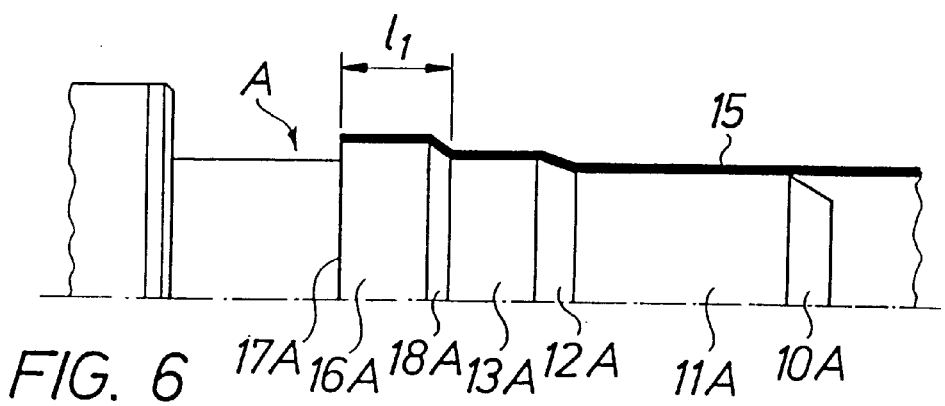

Turning now to the embodiment of FIGS. 5–9 two different mandrels are used when working the second embodiment of the method of the invention. A first mandrel A is shown in FIGS. 5 and 6 and comprises mandrel elements 10A to 13A corresponding to elements 10 to 13 in the embodiment disclosed in FIGS. 1–3 and 4A. However, core 14 is replaced by a cylindrical enlargement 16A of mandrel element 13A, forming a shoulder 17A at the left end thereof and joining mandrel element 13A at a conical transition 18A at the right end thereof. Enlargement 16A has a diameter which corresponds to the diameter of the groove to be formed at the bottom thereof. The second mandrel B is identical with the mandrel disclosed in FIGS. 1–3 and 4A, the elements thereof being numbered 10B–14B.

The first step of the method of the invention according to the second embodiment is shown in FIG. 5 and is identical with the step described with reference to FIG. 1 though it is performed on a mandrel of different shape, viz. mandrel A and more particularly on mandrel element 11A. When the length $l_1$ has been heated to temperature $T_1$ which is above $T_0$ it is displaced axially on mandrel A to be pushed onto mandrel element 13A via transition element 12A och over enlargement 16A via transition element 18A to the position shown in FIG. 6. Length $l_1$ at the opening of the pipe thus will be expanded to the diameter of enlargement 16A, i.e. the maximum diameter of core 14, FIGS. 1–3. The end portion of the pipe is cooled when it is still on mandrel A, e.g. by sprinkling water, and is then withdrawn from mandrel A.

Figure 7:
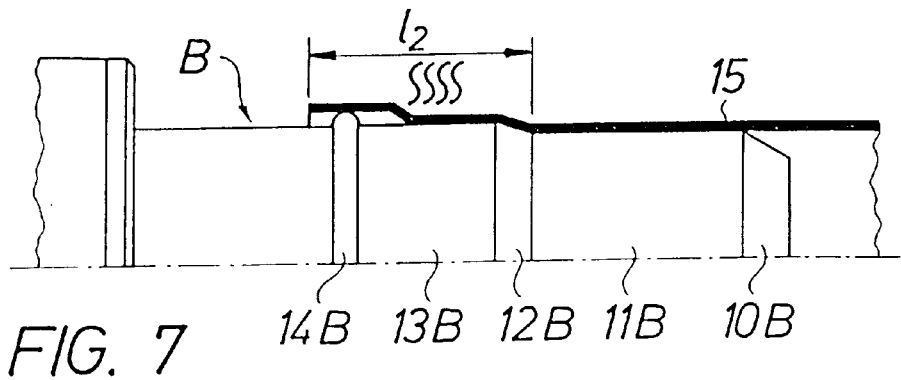
Figure 8:
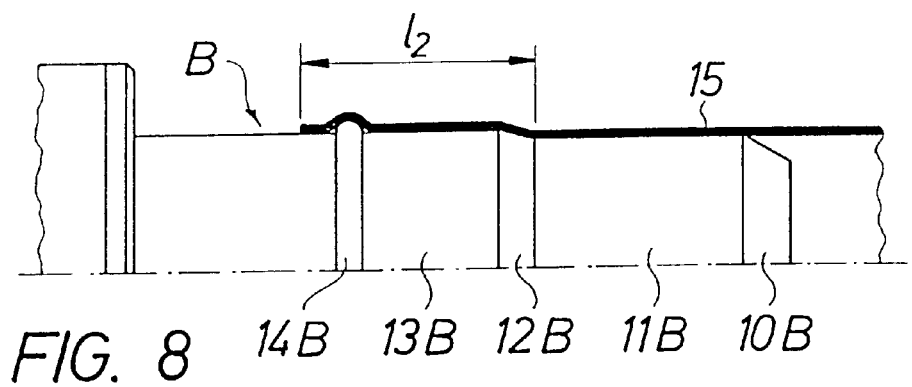
Figure 9:
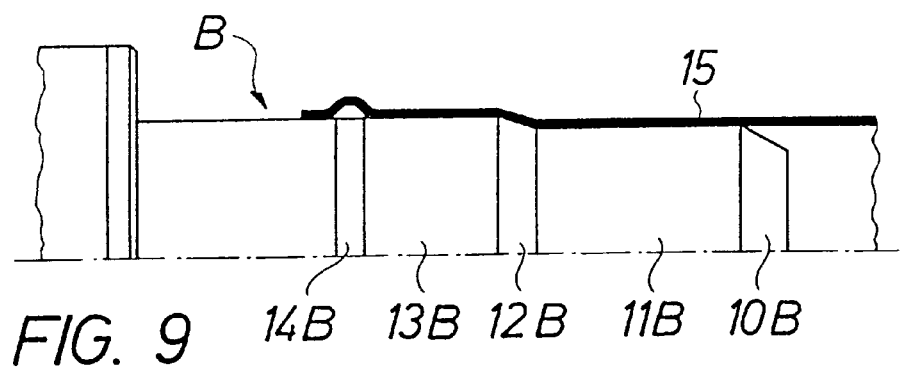

The pipe thus preformed is then pushed onto mandrel B to the position disclosed in FIG. 7 and is reheated over the length $l_2$ to temperature $T_2$ which is above temperature $T_0$ Then the plastic of the pipe will shrink onto the mandrel, and the shape of the socket with the inside groove will be imparted to length $l_2$, FIG 8. After cooling and collapsing of core 14B the socketed pipe will be withdrawn from mandrel B in the manner described with reference to FIGS. 3 and 4A.

The second embodiment of the invention involves an additional step in relation to the first embodiment, viz. the preforming of the end portion of the pipe but on the other side the expansion of the pipe in the step of FIG. 6 may require a lower axial force to be exerted on the pipe which may result in improved quality of the pipe. The embodiment of FIGS. 10–14 can be seen as a modification of the embodiment of FIGS. 1–3 and 4A, wherein the first mandrel element 10 has shorter axial length and is supplemented with an expandible sleeve 19 located adjacent the conical transition element 12. Sleeve 19 is made of an elastic material and can comprise e.g. a rubber sleeve with axial reinforcements, and it can be expanded by means of pressurized fluid. As disclosed in FIG. 11 wherein sleeve 19 is expanded said sleeve in the expanded state thereof comprises a cylindrical central portion 19A having a diameter corresponding to the diameter of the collapsible core 14, and conical end portions 19B and 19C adjacent mandrel element 11 and transition portion 12, respectively. However, central portion 19A can also be conically widening slightly from end portion 19B to end portion 19C for reasons to be explained.

Figure 10:
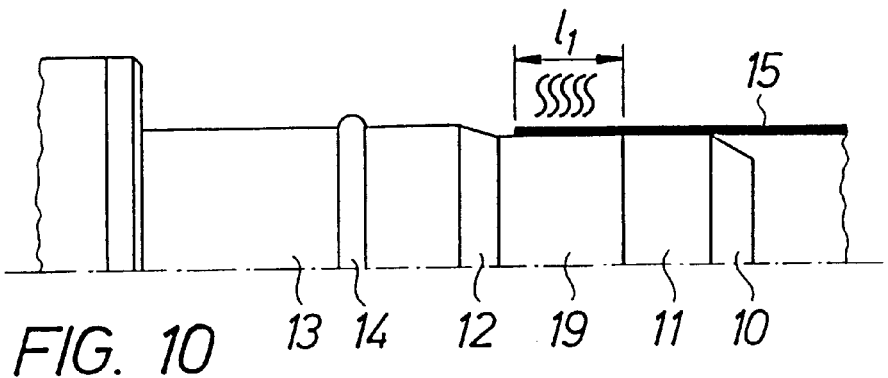

In the step shown in FIG. 10 sleeve 19 is collapsed and the outside diameter thereof conforms with the outside diameter of mandrel element 11 so that the core is flush with said mandrel element. Pipe 15 is pushed onto mandrel element 11 and sleeve 19 as shown in FIG. 10 and is heated to temperature $T_1$ over length $l_1$ said length being located over sleeve 19 which at the same time is under internal pressure by means of pressurized fluid. When the plastic material softens during heating sleeve 19 will expand and will in turn expand pipe 15 to conform with the shape of sleeve 19. If sleeve 19 is conical and the surface thereof is made slippery controlled axial compression can be applied to the plastic material of the pipe when the pipe is expanded on sleeve 19. The pressure of sleeve 19 is released and the pipe is pushed further axially along the mandrel over mandrel element 13 via transition element 12 the end portion of the pipe being pressed over expanded core 14 to the position shown in FIG. 12. The next step, FIG. 13, corresponds to that of FIG. 3, and then the procedure terminates by the step of FIG. 14, which corresponds to that of FIG. 4A.

What is claimed is:

1. A method of socketing a pipe of oriented plastic having an annular groove inside the socket, characterized in
    that an end portion (15) of the pipe is pushed onto a first mandrel element (11; 11A) which is cylindrical and has a diameter corresponding to the inside diameter of the pipe,
    that the end portion is heated to a temperature ($T_1$) which is above the glass transition temperature ($T_g$) of amorphous plastic and is above the crystalline melting point ($T_m$) of crystalline plastic, respectively, on said cylindrical mandrel element in the region ($l_1$) of the end portion of the pipe where the groove is to be located said region being located at the opening of said end portion of the pipe, the rest of said end portion of the pipe being maintained at a temperature below the glass transition temperature or the crystalline melting point, respectively,
    that the end portion (15) when said region is at a temperature above the glass transition temperature or the crystalline melting point, respectively, is pushed onto a second mandrel element (13; 13A) axially aligned with said first mandrel element the bottom portion of the socket being formed by said second mandrel element (13; 13A), and
    that the groove is formed by means of a core (14) in said region of the expanded end portion when being at a temperature above the glass transition temperature or the crystalline melting point, respectively.

2. The method of claim 1, characterized in that the groove is formed by means of a collapsible core (14).

3. The method of claim 1, characterized in that the groove is formed by means of a sealing ring slipped onto said second mandrel element (13; 13A) to form said core, said sealing ring being left in the groove formed when said end portion (15) is withdrawn from said second mandrel element.

4. The method of claim 1, characterized in that the groove is formed by means of a separate core slipped onto said second mandrel and having a preformed groove therein, said core being left in the pipe when said end portion is withdradwn from said second mandrel element to receive a sealing ring in the preformed groove therein.

5. The method of any of claims 1 to 4, characterized in that the end portion (15), when said region is at a temperature above the glass transition temperature or the crystalline melting point, respectively, is expanded to an inside diameter corresponding to the inside diameter at the bottom of the groove to be formed.

6. The method of claim 5 characterized in that the groove is formed in said region of the end portion when this is located on said second mandrel element (13) provided with the core (14).

7. The method of claim 6, characterized in that the entire socket after having been pushed over said second mandrel element (13) is heated to a temperature above the glass transition temperature ($T_g$) or the crystalline melting point ($T_m$), respectively, to conform by shrinking with the shape of said second mandrel element.

8. The method of any of claims 5 to 7, characterized in that said end portion of the pipe is cooled and is then withdrawn from the first and second mandrel elements (11,11A; 13,13A).

9. The method of claim 6 characterized in that said end portion (15) after having been withdrawn from said first and second mandrel elements (11A, 13A) is pushed onto a third mandrel element (13B) and is reheated to a temperature above the glass transition temperature ($T_g$) or the crystalline melting point ($T_m$), respectively, to conform by shrinking to the shape of said third mandrel element for forming the remaining part of the socket on said third mandrel element having a collapsible core (14B) for forming said groove inside the socket, the end portion being cooled and then withdrawn from said third mandrel element.

10. The method of claim 6 characterized in that the end portion (15) is expanded during heating on said first mandrel element (11).

11. The method of claim 10 characterized in that the end portion (15) is expanded by means of a pressurized sleeve (19) on said first mandrel element.

12. The method of claim 11 characterized in that the end portion is expanded on said sleeve (19) to form a conical socket.

13. The method of any of claims 1 to 12, characterized in that said end portion (15) of the pipe before being pushed onto said first mandrel element (11; 11A) is heated to a temperature close to but still below the glass transition temperature ($T_g$).

14. The method of any of claims 1 to 13 characterized in that the plastic of the pipe is polyvinylchloride.

15. The method of claim 14 characterized in that any temperature above the glass transition temperature ($T_g$) or the crystalline melting point, respectively, is at most 105° C.

16. The method of any of claims 1 to 13 characterized in that the plastic of the pipe is crosslinked polyethylene.

17. The method of claim 16 characterized in that any temperature above the glass transition temperature ($T_g$) or the crystalline melting point ($T_m$), respectively, is at most 190° C.

18. The method of any of claims 1 to 17 characterized in that said end portion of the pipe is pushed over said core (14) on said second mandrel element (13) along a collapsible path (13') gradually ascending to the top of the core in an expanded state, said path then being collapsed when the end portion is positioned on said second mandrel element.

19. The method of any of claims 1 to 18, characterized in that heating of the pipe is effected by hot fluid spray, IR radiation, or circulating hot gas.

20. The method of claim 19 characterized in that the IR radiation when used for heating the pipe has a wave length which deviates from the wavelengths at which the material of the pipe has IR absorption peaks.

\* \* \* \* \*